United States Patent
Florjancic et al.

(10) Patent No.: US 6,712,581 B2
(45) Date of Patent: Mar. 30, 2004

(54) PROCESS FOR PRODUCING A GROOVE-LIKE RECESS, AND A GROOVE-LIKE RECESS OF THIS TYPE

(75) Inventors: Stefan Florjancic, Mellingen (CH); Ulrich Rathmann, Baden (CH)

(73) Assignee: Alstom Technology LTD, Baden (CH)

( * ) Notice: Subject to any disclaimer, the term of this patent is extended or adjusted under 35 U.S.C. 154(b) by 0 days.

(21) Appl. No.: 10/219,323

(22) Filed: Aug. 16, 2002

(65) Prior Publication Data
US 2003/0057654 A1 Mar. 27, 2003

(30) Foreign Application Priority Data
Aug. 21, 2001 (CH) ............................. 1548/01

(51) Int. Cl.$^7$ ................................. F01D 11/00
(52) U.S. Cl. ..................... 415/135; 415/139; 29/557
(58) Field of Search ..................... 415/135, 139, 415/173; 416/248; 29/557, 558

(56) References Cited
U.S. PATENT DOCUMENTS

| | | |
|---|---|---|
| 3,752,598 A | 8/1973 | Bowers et al. |
| 4,549,058 A | 10/1985 | DelMastro et al. |
| 5,154,577 A | 10/1992 | Kellock et al. |
| 5,531,457 A | 7/1996 | Tibbott et al. |
| 5,655,876 A | 8/1997 | Rock et al. |

*Primary Examiner*—Edward K. Look
*Assistant Examiner*—Kimya N McCoy
(74) *Attorney, Agent, or Firm*—Adam J. Cermak

(57) ABSTRACT

A process for producing a groove-like recess which is part of a strip seal between two components which enclose a gap, uses a material-removing process technology to create the groove-like recess in the two components in such a manner that the groove-like recess in each of the two components, after orientation with respect to one another, lie substantially opposite one another in an end position in which they enclose the gap between them, and that a strip element can be introduced into the groove-like recesses in such a manner that the strip element at least partially projects into both groove-like recesses and, under the action of a force, forms a substantially gastight joint with the groove-like recesses in the two components. Furthermore, a groove-like recess of this type is part of a strip seal.

20 Claims, 3 Drawing Sheets

Figure 1A:
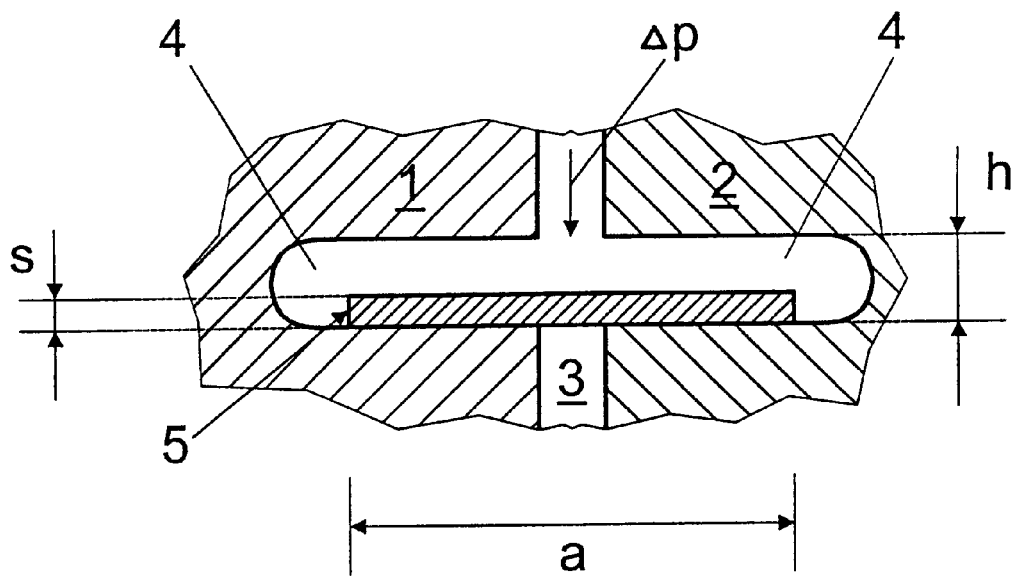

PROCESS FOR PRODUCING A GROOVE-LIKE RECESS, AND A GROOVE-LIKE RECESS OF THIS TYPE

TECHNICAL FIELD

The invention relates to a process for producing a groove-like recess which is part of a strip seal between two components which enclose a gap, using a material-removing process technology to create the groove-like recess in the two components in such a manner that the groove-like recess in each of the two components, after orientation with respect to one another, lie substantially opposite one another in an end position in which they enclose the gap between them, and that a strip element can be introduced into the groove-like recesses in such a manner that the strip element at least partially projects into both groove-like recesses and, under the action of a force, forms a substantially gastight join with the groove-like recesses in the two components. The invention also describes a groove-like recess of this type as part of a strip seal.

PRIOR ART

Strip seals of the generic type described above are used in particular in gas turbine technology, in order to preferably completely eliminate leakage flows which occur through the gap between two components arranged directly adjacent to one another.

The explanations given below relate to a specific application of a strip seal within a gas turbine, but it should be noted at this point that strip seals are used in a wide range of other application areas, to which the following statements can readily be transferred.

U.S. Pat. No. 5,531,457 has disclosed a strip seal arrangement which is used to seal two adjacent gas turbine blades or vanes in order to delimit the volume of the hot-gas passage in a gastight manner from a cooling air volume located below the blade or vane roots. The rotor blades or guide vanes which are arranged in large numbers over the circumferential direction of a rotor or stator arrangement project into what are known as securing grooves, in order for them to be secured by means of their roots, and as a result adopt a fixed position relative to the gas turbine blades or vanes which are in each case arranged adjacent to them. For cooling purposes, the individual gas turbine blades or vanes are supplied with highly compressed cooling air, which is generally branched off from the compressor stage of the gas turbine installation via bypass lines, from the sides of their roots. Most of the incoming air supplied passes into a cooling passage system which is machined into the gas turbine blade or vane and provides cooling passage openings in the region of the respective blade or vane roots in order to feeding cooling air. However, cooling air losses occur at those locations at which, between two gas turbine blades or vanes arranged adjacent to one another in a row of blades or vanes, there is a gap between the turbine blades or vanes which preferably adjoin one another in the root region. Although it is known that leakage or loss flows which occur through gaps of this type can be reduced considerably by minimizing the gap width, a tight fit of this type between two adjacent gas turbine blades or vanes leads to mechanical constraints which are associated with considerable material stresses in particular on account of the high thermal loads and the thermal expansion of the materials.

An alternative, effective seal which is also gentle on the material is illustrated and described in the abovementioned U.S. Pat. No. 5,531,457, in particular in FIG. 3 of this patent. In this case, the root regions of two adjacent turbine blades or vanes each provide the opposite, groove-like recesses, into which a strip element projects on both sides, in order to effectively reduce a leakage flow through the gap enclosed between the two blade or vane roots.

Hitherto, groove-like recesses of this type have been produced using erosion techniques which are known per se and allow what are known as pierced grooves to be introduced. In this context, spark-erosion material-removal processes, in particular cavity sinking by spark erosion, are particularly preferably suitable, allowing pierced or countersunk grooves of virtually any desired shape and size to be machined into the solid material of the blade or vane root. The use of erosion processes leads to a high-quality surface within the groove-like recess produced using the process, which makes a considerable contribution to producing a gastight seal by means of the strip element which is introduced in the groove. However, a drawback of erosion processes of this type is the very considerable amount of time which is required to produce the sealing grooves with a high surface quality and which greatly increases costs in particular for industrial mass production.

Although alternative material-removal processes are also known, such as for example grinding, which likewise allows good surface qualities to be achieved within the groove-like recess which can be produced by the grinding process, grinding processes can only be used at grooves which are open on the longitudinal side, with a free groove outlet. Therefore, countersunk or pierced groove profiles cannot be produced by means of simple grinding processes. Moreover, the possible options for different shaping in terms of the internal contour in the groove-like recess or sealing groove are very limited when grinding is used.

SUMMARY OF THE INVENTION

The object of the invention is to provide a process for producing a groove-like recess, which in particular forms part of a strip seal between two components which enclose a sealing gap, using a material-removing process in such a manner that, firstly, it is possible to achieve a high surface quality at the groove surface, which is required in order to produce a desired gastight seal, and secondly the material-removing process used also allows industrial mass production with considerably reduced production costs, i.e. with much shorter process times.

A further object is to provide a groove-like recess which satisfies the above requirements and in particular has an optimized sealing action.

The solution to the object on which the invention is based forms the subject matter of claim 1. Claim 14 relates to a groove-like recess which is formed in accordance with the invention as part of a strip seal which, in a particularly preferred application as described in claims 16 and 17, is used in turbo machines, in particular gas turbine installations.

According to the invention, a process for producing a groove-like recess in accordance with the preamble of claim 1 is carried out in such a manner that the material-removing process technology is carried out in at least two successive steps, namely in a first step in which material is removed at a first material-removal rate and in a subsequent second step, in which material is removed at a second material-removal rate, and that the first material-removal rate is greater than the second material-removal rate. Unlike in the previous known way of producing a groove-like recess which is to be introduced into a component and which is part of a strip seal, in which the groove-like recess is obtained with the aid of an erosion process which produces a high surface quality of the groove, according to the invention removal of material is carried out in two steps, of which a first step involves removing material as quickly as possible by what is known as roughing, producing a machined surface which has a slightly lower surface quality, which can nonetheless deliberately be accepted. Only in a subsequent second step is material within the groove-like recess which already exists removed by means of a finishing operation using a material-removal process which, although it has a slower material-removal rate, leads to a much higher surface quality, as is the case, for example, with the erosion process which is known per se.

According to the invention, it has been recognized that, in order to avoid unnecessarily long process times during the production of the abovementioned groove-like recesses, material can be removed at high material-removal rates in groove regions which do not come into contact with the strip element during the subsequent sealing action. Only the contact regions between the strip element and the groove-like recesses have to be produced with a high quality, i.e. with minimum possible surface roughness, since these contact regions make a decisive contribution to the gastight seal.

In principle, it is possible for all material-removal processes to be used for the rapid removal of material, for example milling, grinding or erosive roughing processes, with which, depending on the work flow, it is possible to achieve removal rates of 600 cubic millimeters per minute and above for the machining of surfaces with a lower surface quality.

To remove material in the second process step, i.e. to create the highest possible surface qualities, the erosive finishing process is particularly suitable, either allowing finished-machining of a first material surface which has already been produced by the previous material-removal step or producing new material surfaces with particularly good material surface qualities by the fresh removal of material.

Of course, it is also possible to use more than two process steps to remove material, these steps each differing with regard to the level of their material-removal rates and the surface qualities which can be produced therewith. It is advantageous to start by using material-removal processes which achieve the highest possible material-removal rates. Then, in the further steps material-removal processes which are able to produce ever better material surface qualities are used.

The groove depths and groove widths which can be produced using the material-removal process and therefore fundamentally the groove shapes which can be produced can be designed in virtually any desired size and shape in particular when erosive removal processes are used.

Particularly advantageously, the groove width of the groove-like recess is dimensioned even at its narrowest point in such a manner that the narrowest point is greater than the thickness of the strip element, so that to produce a strip seal the strip element projects into both opposite groove-like recesses on both sides. In this case, the strip element can move virtually as desired within the mutually opposite groove-like recesses in the two components. The strip element is only pressed onto certain regions of the inner contour of the groove-like recess, known as the contact regions, by the action of an external force field on the strip element transversely with respect to its longitudinal extent. Precisely these contact regions are created with a particularly high surface quality, i.e. the lowest possible surface roughness. By contrast, all the other groove surface regions can have lower surface qualities.

The abovementioned force field which acts on the strip element within the groove-like recesses is in the present example brought about by the pressure difference prevailing radially with respect to the blade or vane extent between the cooling volume and the hot-gas passage which is oriented radially with respect to the blades or vanes. Moreover, the strip element, if it is mounted within the roots of rotor blades in a rotor arrangement, is subject to the centrifugal forces which additionally act on the strip element and are superimposed cumulatively on the force caused by the pressure difference.

BRIEF DESCRIPTION OF THE INVENTION

The invention is described by way of example below, without restriction to the general idea of the invention, on the basis of exemplary embodiments and with reference to the drawings, in which:

FIGS. 1a, b show diagrammatic cross-sectional illustrations through a strip seal between two components which enclose a sealing gap (prior art), FIGS. 2a–d show cross-sectional llustrations through groove-like recesses which have been designed in accordance with the invention within two components positioned opposite one another.

WAYS OF CARRYING OUT THE INVENTION, INDUSTRIAL APPLICABILITY

FIGS. 1a and b each show a strip seal which is known per se between two components 1 and 2.

Figure 1B:
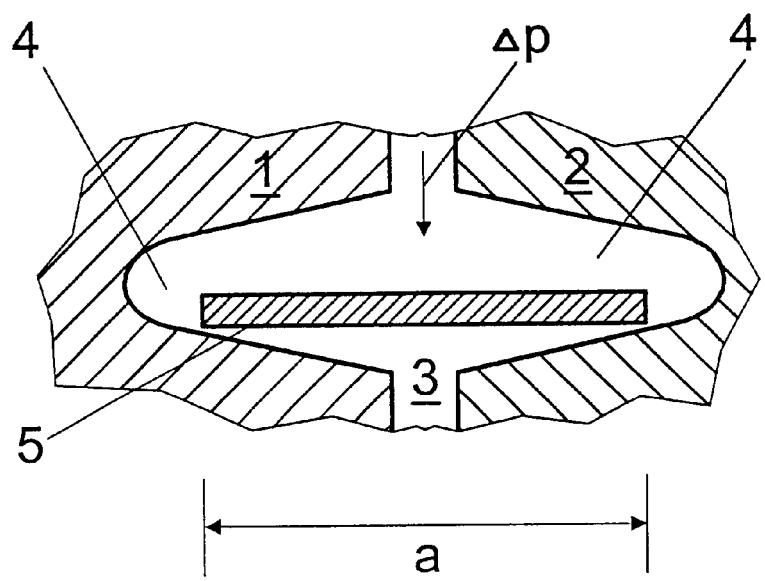

The cross-sectional illustrations shown in FIGS. 1a and b show two components 1, 2 which lie directly opposite one another and together enclose a sealing gap 3. In each case one groove-like recess 4 is machined into each of the two components 1, 2 and, in a corresponding end position of the two components 1, 2, these recesses preferably lie directly opposite one another. In the exemplary embodiment shown in FIG. 1a, the two groove-like recesses are designed approximately as rectangular countersunk grooves. The embodiment of a strip seal illustrated in FIG. 1b, by contrast, has V-shaped or trapezoid-shaped groove-like recesses 4.

A strip element 5, which is formed as a thin strip of sheet metal, is introduced into the interior of the groove-like recesses 4, is pressed onto the inner contour of the groove-like recesses 4 on one side by an external pressure difference Δp and forms a preferably gastight join therewith.

To compensate for possible misalignments between the two components 1, 2 with regard to the opposite groove-like recesses 4 and as far as possible to avoid constraints between the individual components 1, 2 caused by thermal expansion, the groove width h is preferably selected to be greater than the thickness s of the strip element 5. Moreover, the groove depth of each individual groove-like recess 4 is to be selected to be as great as possible, so that the maximum possible width of the strip element 5, known as the span a, can be produced. The greater the span a, the better the sealing effects and service lives of the overall strip arrangement it is possible to achieve.

Figure 2A:
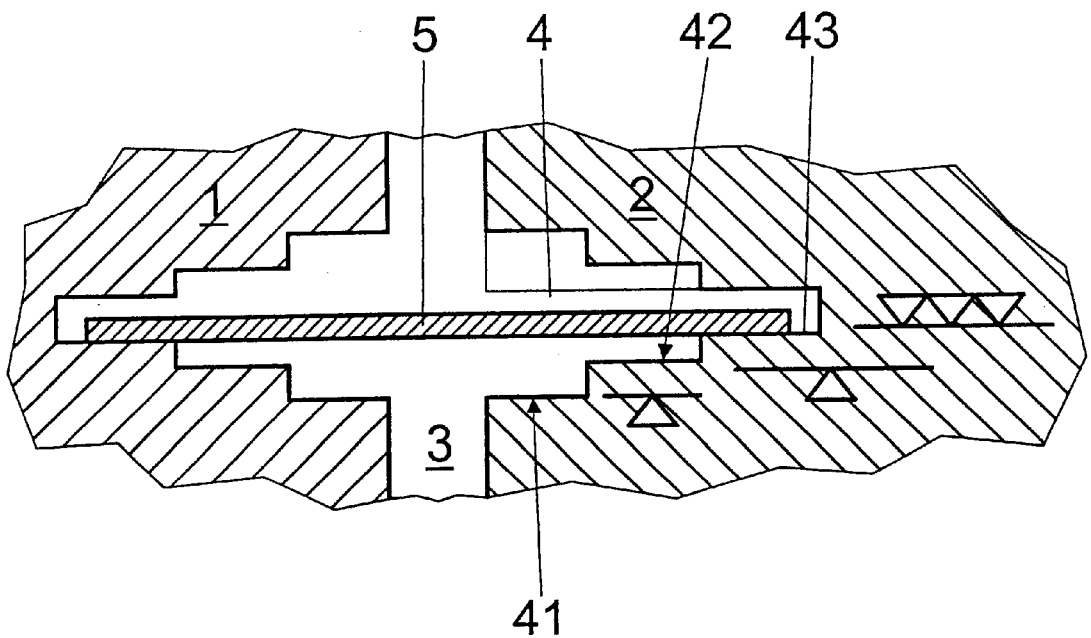

FIG. 2a shows a cross section through two components 1, 2 each having a groove-like recess 4 which has been designed in accordance with the invention. The groove-like recess 4 has a cross section which is designed to narrow in steps as the groove depth increases. The groove regions 41 and 42 have been produced using an erosive roughing process and each have a low to normal surface quality at their material surface. By contrast, the material surface region 43 has been produced using an erosive finishing process or by subsequent smoothing of the surface by means of a deforming or stamping process and consequently has a particularly smooth surface. The strip element 5 rests flush against this very material surface region 43 in order to produce a gastight seal.

Figure 2B:
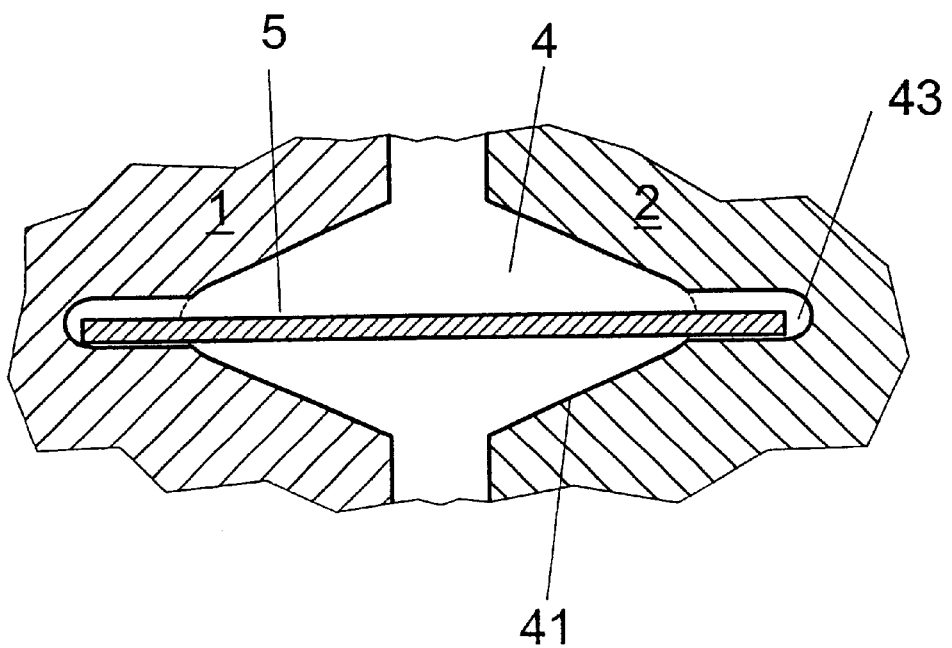

The cross-sectional illustration in accordance with FIG. 2b shows a comparable arrangement of components to that shown in FIG. 2a, except that the V-shaped groove region 41 has been produced using a grinding process allowing the highest possible removal of material to be achieved. Furthermore, the groove-like recess 4 has a deeper groove region 43, the inner groove surface of which has a particularly high surface quality. As mentioned above, the groove region 43 has been produced using an erosion process, preferably by means of erosive finishing. The strip element 5, which has a particularly great span and therefore a particularly good sealing action, lies in this very region in order subsequently to produce a gastight join.

Figure 2C:
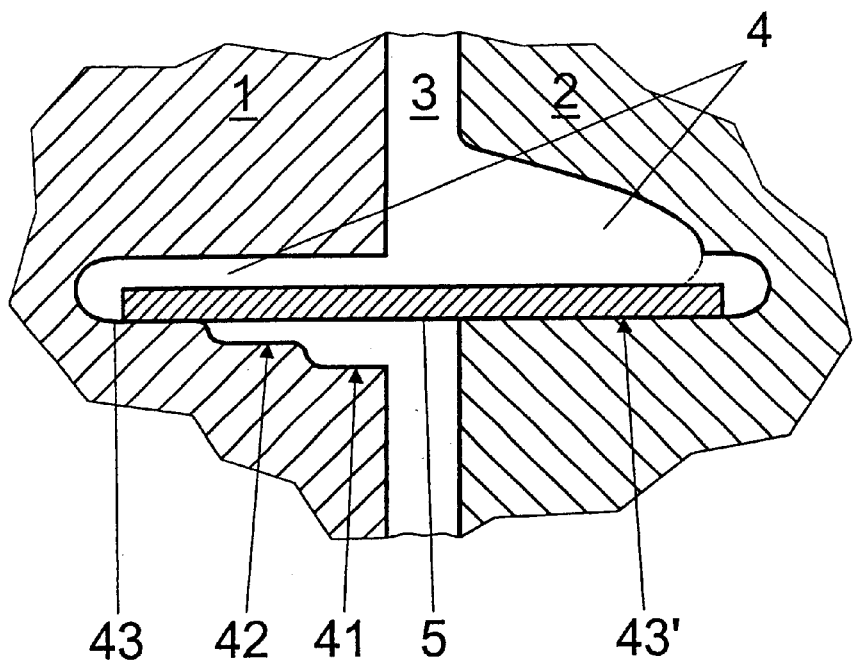

Unlike the exemplary embodiments shown above in FIGS. 2a and b, FIG. 2c illustrates a cross-sectional illustration through two components 1 and 2 which each have a groove-like recess 4, but these recesses are formed asymmetrically with respect to one another. The specific geometric design of the groove-like recess 4 is dependent on the deformations which are to be expected within the groove and/or stipulated tolerances and may quite easily deviate from a symmetrical structure.

The groove-like recesses 4 shown in FIG. 2c have also been formed in the manner described above. Therefore, the groove-like recess 4 illustrated on the left in FIG. 2c has a material surface which has been produced by means of erosion processes in the region 43, and the strip element 5 rests in a gastight manner on this surface. By contrast, the entire surface 43' in the groove-like recess 4 illustrated on the right in FIG. 2c has been formed with a particularly high surface quality as part of an erosion process. In this case too, the desired surface quality can be produced by deformation by means of a ram. When this process is used, the surface can be smoothed by means of a stamping operation, and in this way the desired surface quality can be achieved. By contrast, all the remaining regions of the groove can be of reduced surface quality and can therefore be produced using processes with a faster material removal rate. These regions can be produced by means of grinding or roughing processes.

Figure 2D:
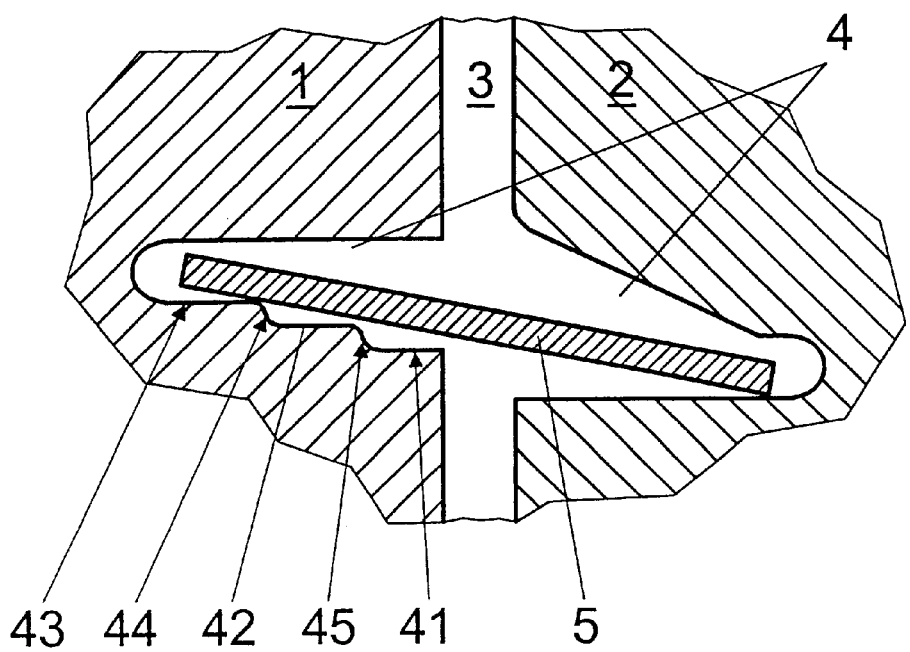

FIG. 2d likewise shows a cross-sectional illustration through two groove-like recesses 4 formed asymmetrically with respect to one another within two opposite components 1 and 2. It has proven particularly advantageous for the transitions 44 and 45 between two material regions 41, 42, 43 which have each been produced using different material removal processes to be rounded by means of abrasive processes, preferably using sand-blasting, shot-peening or high-pressure water blasting.

LIST OF REFERENCE SYMBOLS

1, 2 component
3 gap, sealing gap
4 groove-like recess
41, 42, 43 material surface regions
44, 45 transition regions
5 strip element
a span
h groove width
s width of the strip element

What is claimed is:

1. A process for producing a groove-like recess which is part of a strip seal between two components which enclose a gap, the groove-like recess in each of the two components, after orientation with respect to one another, lie substantially opposite one another in an end position in which they enclose the gap between them, and that a strip element can be introduced into the groove-like recesses in such a manner that the strip element at least partially projects into both groove-like recesses and, under the action of a force, forms a substantially gastight joint with the groove-like recesses in the two components, the process for producing a groove-like recess comprising:

first removing material from the two components at a first material-removal rate using a material-removing process technology; and second removing material from the two components at a second material-removal rate using a material-removing process technology;

wherein the first material-removal rate is greater than the second material-removal rate.

2. The process as claimed in claim 1, wherein the material-removing process technology in the first material-removing step produces a machined material surface with a first surface roughness, wherein the material-removing process technology in the second material-removing step produces a machined material surface with a second surface roughness, and wherein the second surface roughness is less than the first.

3. The process as claimed in claim 2, further comprising:

adjoining the material surface with the first surface roughness to the material surface with the second surface roughness via a transition region; and rounding the transition region by a material surface-machining process.

4. The process as claimed in claim 3, wherein the rounding material surface-machining process is selected from the group consisting of sandblasting, shot peening, high-pressure water blasting, stamping, and ram-deforming.

5. The process as claimed in claim 1, wherein the material-removing process technology of the second material-removing step at least produces material surface regions, within the groove-like recess, at which the strip element can form a gastight joint with the respective components.

6. The process as claimed in claim 1, wherein the groove-like recess has a groove depth along which the groove-like recess has a variable cross section.

7. The process as claimed in claim 6, wherein the cross section of the groove-like recess decreases continuously, in steps, or both, as the groove depth increases.

8. The process as claimed in claim 1, wherein the material-removing process technology of the first material-removing step, of the second material removing step, or of both, is selected from the group consisting of grinding, milling, erosion, laser cutting, and water-jet cutting.

9. The process as claimed in claim 1, wherein the material-removing process technology of the first material-removing step comprises an erosive roughing process, and wherein the material-removing process technology of the second material-removing step comprises an erosive finishing process.

10. The process as claimed in claim 1, wherein the material-removing process technology of the first material-removing step comprises an erosion process, and wherein the material-removing process technology of the second material-removing step comprises a grinding process.

11. The process as claimed in claim 10, wherein the erosion process comprises spark erosion.

12. The process as claimed in claim 1, wherein the groove-like recess produced by the first and second material-removing steps has a minimum groove width which is greater than the thickness of the strip element.

13. The process as claimed in claim 1, further comprising:

placing an elastically deformable metal strip as a strip element into the groove-like recess.

14. A groove-like recess useful as part of a strip seal comprising:

two components which enclose a gap therebetween; and a groove-like recess formed in each of the two components so that the groove-like recess in each of the two components, after orientation with respect to one another, lie substantially opposite one another in an end position in which they enclose the gap between them, and into which groove-like recess a strip element can be introduced in such a manner that the strip element projects at least partially into both groove-like recesses and, under the action of a force, can form a substantially gastight joint with the groove-like recesses in the two components;

wherein at least one of the groove-like recesses has at least one first groove surface region with a first surface roughness and at least one second groove surface region with a second surface roughness, and wherein the first surface roughness is less than the second surface roughness.

15. The groove-like recess as claimed in claim 14, wherein the first groove surface region with the first surface roughness is arranged inside the at least one groove-like recess so that the strip element can form the gastight joint with this groove surface region when inserted therein.

16. The groove-like recess as claimed in claim 14, wherein the two components are components within a turbo machine.

17. The groove-like recess as claimed in claim 16, wherein the turbo machine comprises a gas turbine installation.

18. The groove-like recess as claimed in claim 17, wherein the gas turbine installation includes a gas turbine including a hot passage and a cooling-air volume, wherein the components comprise gas turbine blades or vanes, and the groove-like recesses are positioned between the hot passage and the cooling-air volume.

19. The groove-like recess as claimed in claim 18, further comprising:

a strip element positioned within the groove-like recess, the strip element being pressed in a gastight manner onto the respective component by an excess pressure which prevails within the cooling volume compared to the pressure ratios prevailing in the hot passage.

20. The groove-like recess as claimed in claim 14, further comprising a strip element pressed in a gaslight manner into the groove-like recess in each of the two components.

* * * * *